Patented Aug. 15, 1944

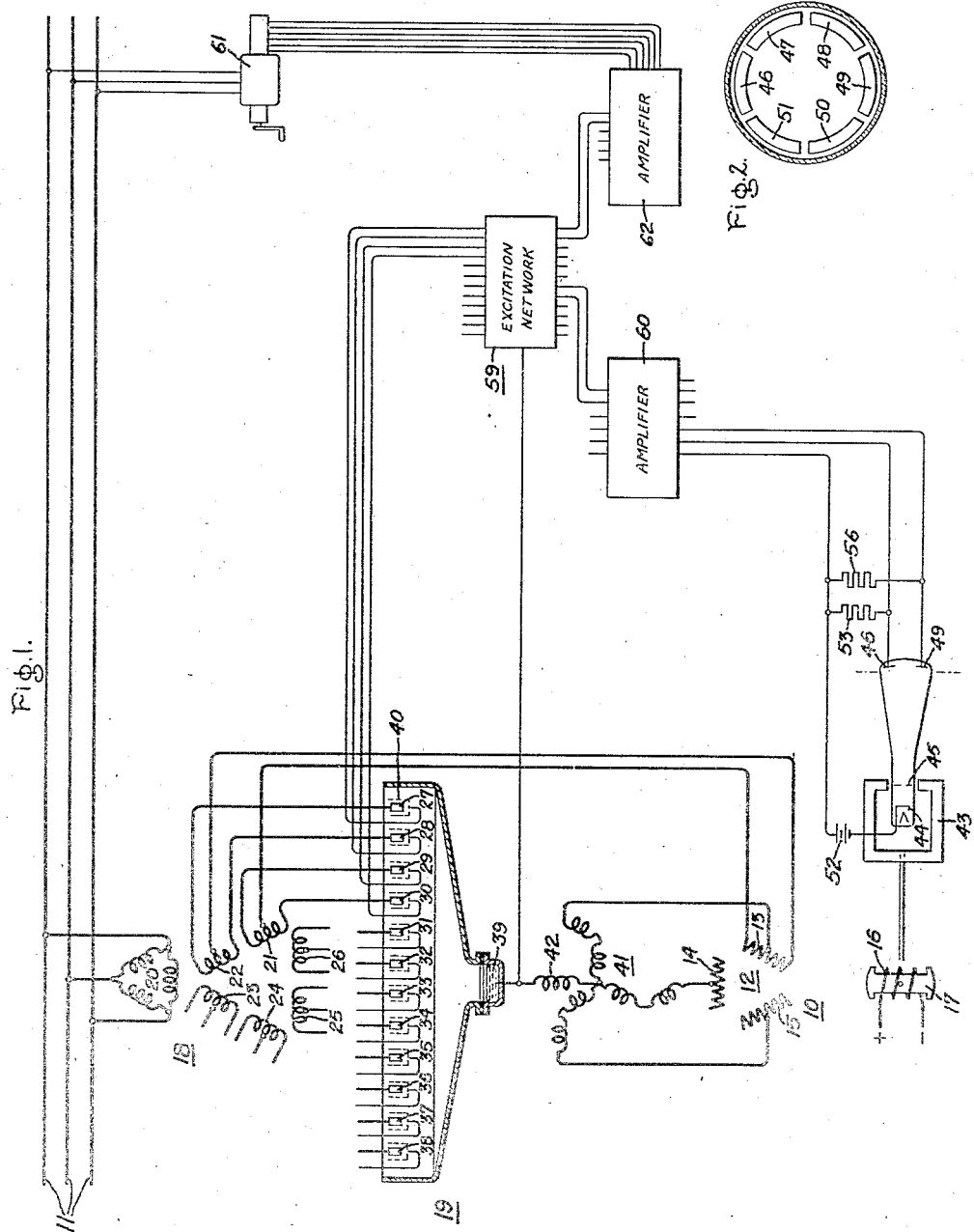

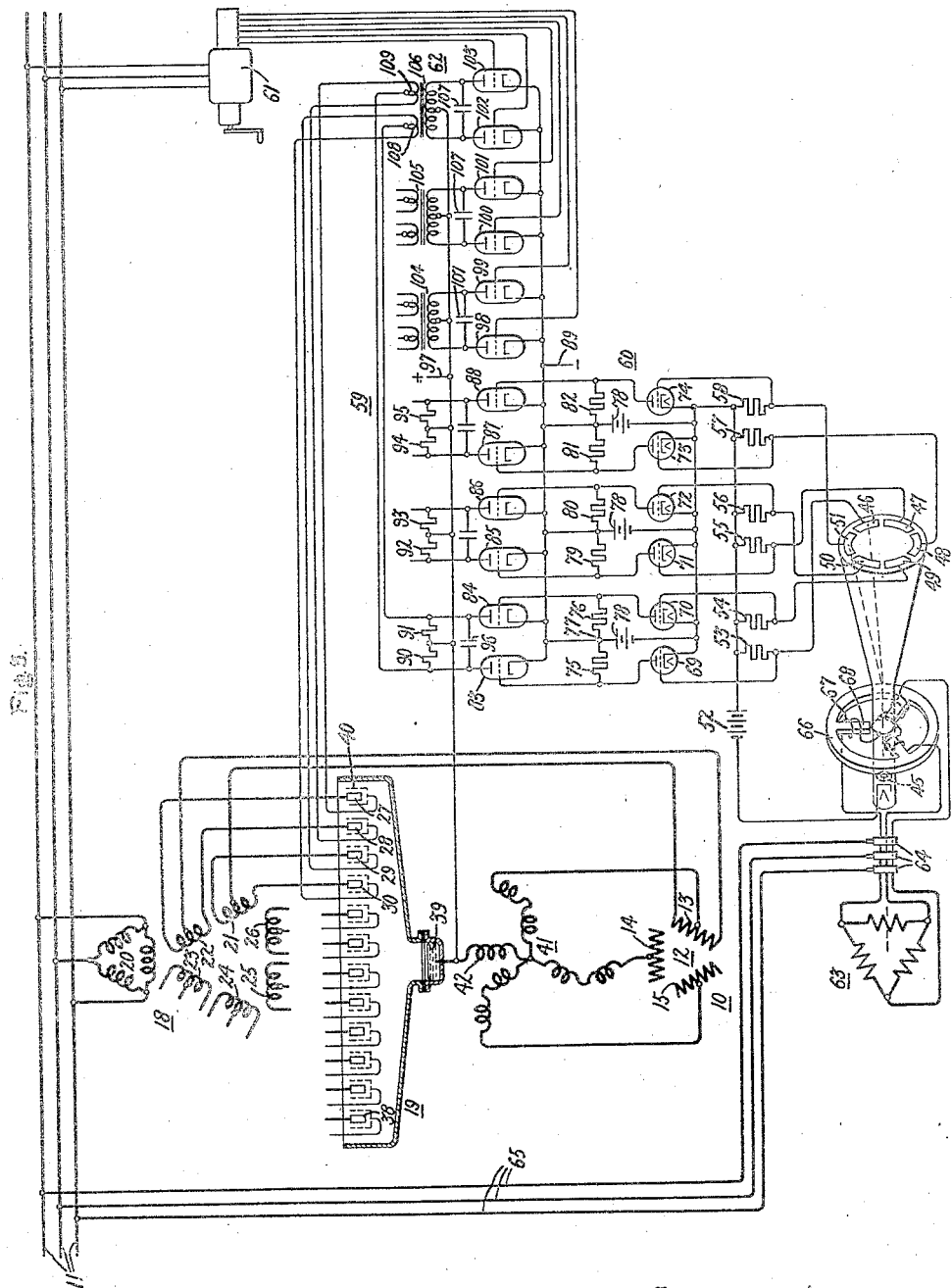

2,355,727

UNITED STATES PATENT OFFICE 2,355,727

ELECTRIC CONTROL CIRCUITS

Friedrich Hölters, Berlin-Lankwitz, Germany; vested in the Alien Property Custodian Application October 20, 1941, Serial No. 415,827
In Germany November 6, 1939

12 Claims. (Cl. 172—274)

My invention relates to electric control circuits and more particularly to electric control circuits for controlling the operation of electric valve translating apparatus for energizing the windings of a dynamo-electric machine.

This application is a continuation-in-part of my application Serial No. 388,913, filed April 16, 1941, and assigned to the same assignee as the present invention.

In control circuits for controlling the operation of dynamo-electric machines energized through electric valve converting apparatus it is often necessary to provide a source of control voltage having a periodicity corresponding to the speed of rotation of the machine if it is of the synchronous type, or corresponding to slip frequency if the dynamo-electric machine is of the asynchronous type. Many arrangements have been devised in the past for producing control impulses of this character. These arrangements include mechanical distributors, magnetic distributors and photo-electric devices. All of these arrangements have been subject to some difficulties from the standpoint of moving parts, electrical connections, or the ability to produce suitable control impulses under variable speed operation. For example, with the asynchronous type of machine it has been difficult to provide simple and reliable control means which function to produce a control voltage of desired magnitude and frequency at zero speed and at speeds approaching synchronism. In accordance with the teachings of my invention I provide an improved control circuit for producing control impulses of the desired frequency for controlling the operation of an electric valve translating apparatus connected to control the energization of the windings of a dynamo-electric machine which is readily applicable to both synchronous and asynchronous machines and which produces a reliable control under widely varying speeds of operation and which is simple and economical to produce.

It is an object of my invention to provide a new and improved electric control system.

It is another object of my invention to provide a new and improved electric control circuit for controlling the conductivities of electric valve means which are connected to control the sequential energization of the windings of a dynamo-electric machine.

It is a still further object of my invention to provide a new and improved electric control circuit employing electrical control for producing control impulses of motor frequency or slip frequency for synchronous and asynchronous dynamo-electric machines, respectively, which is characterized by its simplicity and reliable operation over widely varying operating conditions.

My invention will be better understood by reference to the following description taken in connection with the accompanying drawings, and its scope will be pointed out in the appended claims. In the drawings, Fig. 1 is a schematic representation of my invention applied to a control circuit for an electric valve translating apparatus connected to energize the stator winding of a synchronous type dynamo-electric machine; Fig. 2 is a view of a detail of Fig. 1; Fig. 3 illustrates schematically the system of Fig. 1 as applied to an asynchronous type dynamo-electric machine and with a suitable amplifier and excitation network for energizing the control electrodes in accordance with the impulses produced by operation of the cathode ray tube.

Referring now to Fig. 1 of the drawings, I have shown my invention embodied in an electric valve translating system and control circuit therefor for energizing the windings of a dynamo-electric machine illustrated generally by the numeral 10 from a polyphase alternating current circuit 11. The dynamo-electric machine of Fig. 1 is a motor of the synchronous type having stator windings 12 including phase windings 13, 14 and 15 and a field winding 16 wound on a suitable rotatable magnetic structure 17 and energized from a suitable source of direct current (not shown). If desired, the direct current may be derived from the alternating current circuit 11 by means of suitable rectifying apparatus. The stator windings 12 are connected to be sequentially energized from the alternating current circuit 11 by means of electric translating apparatus including a supply transformer 18 and electric valve means 19. The transformer as illustrated comprises a mesh connected three-phase primary winding 20 and six secondary winding sections 21 to 26, inclusive, two of the winding sections being electromagnetically associated with each of the phases of the primary network 20. The windings 13 to 15 of the electric motor and the windings 21 to 26 of the transformer 17 are each provided with an intermediate terminal and end terminals. The intermediate terminals of the transformer windings 21 to 26 are connected with the end terminals of the windings 13 to 15 of the stator while the end terminals of the windings 21 to 26 are connected respectively to the anodes 27 to 38 of the electric valve means 19. The valve means 19 may be of any suitable type and as illustrated comprises a container having a mercury pool type cathode 39 and control members or grids 40 associated with each of the anodes 27 to 38, inclusive. The valve means preferably is of the type employing an ionizable medium such as a gas or vapor capable of supporting an arc discharge. The intermediate terminals of the stator windings 13 to 15, inclusive, are connected to the cathode 39 through the phase windings of a polyphase interphase transformer or phase equalizing inductive reactance device 41 having the neutral terminal thereof connected to cathode 39 through a smoothing reactor 42.

From a consideration of the above description in connection with Fig. 1, it is clear that the electric valve means 19 provides six groups of discharge paths with each group connected as a full wave rectifier with respect to the alternating current circuit 11 to control the flow of unidirectional current through one-half of each of the windings 13 to 15, inclusive, of the dynamo-electric machine 11. In accordance with my invention I provide an improved control circuit for controlling the energization of the control members 40 associated with the anodes 27 to 38, respectively, to render the pairs of anodes conductive sequentially and in this way sequentially energize the stator windings 12 of the machine 10 to produce a rotating electromagnetic field which interacts with the field produced by the rotor winding 16 to produce torque on the rotor of the machine. As is readily understood by those skilled in the art, the valve means 19 and the connections with the motor windings 12 and transformer 18 may be considered to comprise an electric valve frequency changer operable to transfer current between the supply circuit 11 and the winding 13 of the motor at a frequency determined by the control voltage supplied to the control members of the electric valve means 19. In order to control the conductivities of the discharge paths of the electric valve means 19 in accordance with the position of the rotor structure 17 of the motor, I provide a novel control apparatus including electronic means in the form of a cathode ray tube mounted in fixed relation in space and in alignment with the motor shaft on which is mounted a suitable electromagnetic or permanent magnet means 43 having the pole pieces thereof cooperating with the cathode ray device to deflect the electron beam in accordance with the position of the rotor. Cathode ray tubes suitable for this application may be readily obtained and in the schematic arrangement illustrated the tube comprises a cathode or electron gun 44, an anode or accelerating electrode 45 and six collector plates 46 to 51, inclusive, arranged in circumferentially spaced and insulated relation at the end of the cathode ray tube. Each of the collector plates is connected to the cathode 44 of the tube through a common source of unidirectional voltage such as a battery 52 and individual resistors 53 to 58, inclusive. Only two of the resistors, namely, 53 and 56, have been shown in Fig. 1. As the magnetic structure 43 is rotated by the rotation of the motor rotor the electron beam is deflected from one of the collector plates to another and in this way a voltage appears successively across resistors 53 to 58, inclusive, at a periodicity depending upon the speed of rotation of the motor. It will be noted that the magnitude of the voltages across resistors 53 to 58 is determined by the circuit of the cathode ray tube and is independent of the speed of rotation of the motor rotor which simply determines the duration of each of the current or voltage impulses. It will be noted that the voltage across resistors 53 to 58 will be positive at the common terminal, which is connected to the cathode of the cathode ray tube through battery 52, with respect to the separate terminals of these resistors. These voltage impulses may be applied to the control members 40 of electric valve means by any suitable excitation circuit 59, preferably through an amplifier 60 which is utilized to increase the power available from the cathode ray tube circuit.

An excitation voltage having the frequency of the alternating current circuit 11 may also be impressed on the excitation network 59 by means of a suitable phase shifting device 61 energized from the alternating current circuit 11 and having the output thereof impressed on the excitation network 59 through a suitable amplifier 62.

Before considering the operation of the circuit illustrated in Fig. 1 in detail the embodiment illustrated in Fig. 3 will be described. In Fig. 3 the present invention is shown in a system for controlling the transfer of energy between an alternating current circuit and the induced winding of an asynchronous type dynamo-electric machine. In Fig. 3 the excitation network and amplifiers referred to in Fig. 1 have been shown in more detail. In the arrangement shown in Fig. 3 the same reference numerals as used in Fig. 1 have been employed to designate corresponding parts.

Referring now to Fig. 3, the stator windings 13, 14 and 15 of an asynchronous type dynamo-electric machine 10 are connected with the alternating current circuit 11 through electric valve means 19 and transformer 18. The rotor winding of the asynchronous machine 10 comprises a three-phase mesh-connected network 63 having the terminals thereof connected to the slip rings 64 which are in turn electrically connected to the alternating current circuit 11 by means of conductors 65. In order to control the deflection of the electron beam of the electron tube I provide a polyphase electromagnetic structure 66 having a three-phase Y-connecting winding 67 wound on the poles 68. The end terminals of the winding 67 are connected with the slip rings 64. The magnetic structure 66 is connected to rotate with the rotor of the dynamo-electric machine by a suitable mechanical connection (not shown). The windings of the electromagnet 66 are connected to produce an electromagnetic field rotating at the frequency of the alternating current circuit 11 and in the opposite direction with respect to the mechanical rotation of the rotor 63. In this way the beam of the electron tube is deflected at the difference between rotor speed and the frequency of the alternating current circuit 11 or, in other words, the beam is deflected at the slip frequency of the dynamo-electric machine. With this arrangement the voltage impulses appearing across the resistors 53 to 58, inclusive, have a duration corresponding to slip frequency.

The amplifier and excitation networks employed for controlling the energization of the control members 40 of the electric valve means in accordance with the voltage impulses appearing across resistors 53 to 58 will now be described. In order to amplify the control voltages appearing across resistors 53 to 58 I provide an amplifier 60, preferably employing electric valves 69 to 74 which, as illustrated, are of the three-element, high vacuum type and have the cathodes thereof connected to the common terminal of the resistors 53 to 58, and the control members connected respectively to the other terminals of the resistors 53 to 58. The anodes of the valves 69 and 70 are connected together through resistors 75 and 76 having an intermediate terminal 77 connected to the cathodes of the valves 69 and 70 through a suitable source of direct current voltage illustrated as comprising a battery 78. The remainder of the amplifier valves 71, 72, and 73, 74 are arranged in groups and are similarly connected to produce output voltages across resistors 79, 80, 81 and 82.

The voltages appearing across resistors 75, 76 and 79–82, inclusive, are of 60 electrical degrees duration measured at the frequency of rotation of the electron beam when an electron tube having six collectors is utilized. These may be used to control directly the conductivities of the electric discharge valves if it is desired to energize one winding at a time in sequence. However, it may be desirable to arrange the excitation system to energize a plurality of windings simultaneously and to change the windings which are energized sequentially at intervals corresponding to 60 electrical degrees. In the arrangement illustrated this is accomplished by controlling the valves of an inverter circuit in accordance with the voltage impulses appearing across the resistors 75 and 76, and 79 to 82, inclusive.

Referring now to the drawings, the inverter circuit comprises six electric valves 83 to 88, inclusive, each preferably being of the type utilizing a gas or vapor and comprising an anode, a cathode and a control member. The valves are arranged in three groups of two each and are connected to form three inverters of the parallel type. The cathodes are connected together and to the negative lead of a direct current supply 89 and the anodes of each pair are connected together through resistances 90, 91; 92, 93; and 94, 95. The midpoints of the pairs of resistors are connected to the cathode 39 of the electric valve means 19. A suitable commutating capacitor 96 is connected between the anodes of each pair of valves forming an inverter. The midterminals of the pairs of resistors associated with each pair of electric valves are also connected to the positive lead 97 of the direct current source.

It may be desirable also to control the discharge paths formed by the anodes 27 to 38, inclusive, and the cooperating cathode 39 in accordance with the frequency of the circuit 11. This may be accomplished by a suitable phase multiplying circuit for producing six-phase voltages at the frequency of the supply circuit 11. In the arrangement illustrated this is accomplished by a phase-shifting device 61 and a suitable amplifying arrangement illustrated generally by the numeral 62 which may comprise parallel inverters similar to those just described and energized from the direct current supply leads 89 and 97. The inverter will not be described in detail but comprises in general the electric valves 98 to 103, output transformers 104, 105 and 106 and the commutating capacitors 107. The control members of the electric valves are controlled in accordance with the output voltages of the phase shifting device 61. The output transformers 104 to 106, inclusive, each comprise a pair of center tapped secondary windings 108 and 109. The secondary windings 108 and 109 of the transformer 106 are shown with the midtaps thereof connected with the end terminals of the resistors 90 and 91 respectively and with the end terminals thereof connected to the control members associated with the anodes 27, 28, 29 and 30, respectively. It will be understood that the remainder of the transformer secondaries and the terminals of the resistors 92 to 95 are connected to energize the control members 40 associated with the remaining anodes 30 to 38 of the electric valve means 19.

A brief consideration of the operation of the arrangement shown in Fig. 3 will serve to bring out the features and advantages of my invention. From the description which has preceded, it is apparent that the electron beam of the electron or cathode ray tubes is deflected at slip frequency in a circular path and contacts the collector plates 46 to 51 in succession at intervals corresponding to 60 electrical degrees of slip frequency. As previously pointed out, this produces voltages across the resistors 53 to 58 which are positive at the common terminals thereof with respect to the individual terminals thereof. This means that the voltages impressed on the control members of the amplifier valves 69 to 74, inclusive, become negative at the time that the electron beam falls on the corresponding collector plate. For example, when the electron beam falls on the collector plate 46 the voltage across resistor 53 becomes negative and renders valve 69 nonconductive. This causes the voltage appearing across resistor 75 to disappear. It will be noted that the polarity of the voltage across resistor 75 is such as to maintain the control member of valve 83 negative and when it disappears valve 83 becomes conductive. As the electron beam leaves the collector plate 46 the valve 83 does not become nonconductive at once, however, since the valve is energized from a direct current source and valve 84, which is the other valve of the parallel inverter, is not rendered conductive until 180 electrical degrees later when the electron beam falls on the collector plate 49. In this way a negative voltage appears across resistor 90 for a period of 180 electrical degrees of slip frequency.

From the foregoing description it is seen that as the beam progresses from one collector plate to another one electric valve of each of the inverter circuits comprising the valves 83, 84; 85, 86; and 87, 88 is rendered conductive and remains conductive for 180 electrical degrees of slip frequency at which time the other valve of that group is rendered conductive by the electron beam falling on the collector plate by which the particular valve is controlled. In this way the voltages across resistors 90, 91; 92, 93; and 94, 95 provide three single-phase rectangular waves of voltage of slip frequency and are impressed on the control members of the electric valves to render the discharge paths conductive in proper sequence to transfer energy between the circuit 11 and the stator winding 12 at slip frequency. Thus valve 83 starts conducting when the beam strikes collector plate 46 and remains conducting until 180 electrical degrees later when valve 84 is rendered conductive in response to the beam falling upon collector plate 49. The voltage impressed on the control members associated with anodes 27 and 28 is negative when valve 83 is conducting and in this way the half of winding 13 energized by current conducted through anodes 27 and 28 is deenergized for the 180 electrical degrees of slip frequency during which the beam travels from collector plate 46 to collector plate 49. The resistors 92 to 95 are connected in circuit with the control members 40 associated with the remaining anodes and the transformer windings 22 to 26 are connected with the motor windings in such a way that three winding sections of the windings 13, 14 and 15 which are electrically displaced 60 degrees at slip frequency with respect to each other are simultaneously energized. As the electron beam falls upon the next collector plate the winding which trails electrically is deenergized and the next winding in a leading direction is rendered conducting. It is, of course, possible to utilize the impulses produced across resistors 53 to 58 more directly simply by amplifying them and utilizing these impulses to control the energization of the control members. In this event only one winding section would be energized at a time. However, the present arrangement provides for a better utilization of the windings of the dynamo-electric machine.

The excitation at the frequency of the circuit 11 is added to the slip frequency control voltage by means of the transformer winding. As is well understood by those skilled in the art when the asynchronous machine is operating below synchronous speed as an induction motor, energy is supplied by the stator winding through the valve means to the circuit 11. At this time the slip frequency excitation is rectifier excitation while the excitation at the frequency of the circuit 11 is inverter excitation. The proper phase relation of these excitation voltages may be provided by adjustment of the phase-shifting device 61 and by mechanical rotation of the electron tube. Similarly, when the machine is operating at a speed corresponding to a frequency above that of the circuit 11, energy is supplied to the winding 12 through the electric valve means and in this case the slip frequency excitation is the inverter excitation and the excitation at the frequency of the circuit 11 is the rectifier excitation. It is apparent from the foregoing description that the arrangement, according to the present invention, provides a system for providing slip frequency excitation in which the rectangular waves of slip frequency voltage are of a magnitude which is independent of the speed at which the machine is operating. The machine also requires a minimum of mechanical equipment and is characterized by reliable operation under widely varying operating conditions.

It is to be understood that the amplifier and excitation network employed in connection with Fig. 3 may be substituted for the amplifiers and excitation network illustrated schematically in connection with Fig. 1. In the operation of the system of Fig. 1, however, the control voltages are of rotational frequency as is well understood by those skilled in the art.

While I have described what I at present consider preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric circuit, a dynamo-electric machine including a plurality of windings and a rotor core, electric valve means interconnecting said circuit and said windings, means for controlling the conductivities of said electric valve means to control the speed of rotation of said rotor core comprising an electronic tube for producing an electron beam, means mechanically connected to the rotor core of said machine for deflecting said electron beam in a predetermined path for each revolution of said rotor core, a plurality of electrodes associated with said tube and mounted in electrically insulated relation in the path of said electron beam, and means in circuit with said electrodes for producing control voltage impulses for controlling said electric valve means and having a duration dependent upon the speed of rotation of said rotor core.

2. In combination, an electric circuit, a dynamo-electric machine including a plurality of windings and a rotor core, electric valve means interconnecting said circuit and said windings, means for controlling the conductivities of said electric valve means to control the speed of rotation of said rotor core comprising an electron tube for producing an electron beam, means for producing a magnetic field having a speed of rotation dependent upon the speed of rotation of said rotor core and cooperating with said electron tube to deflect the beam thereof in a predetermined path for each revolution of said rotor core, a plurality of electrodes mounted in the path of said electron beam, and a control circuit connected with said electrodes for impressing on said electric valve means control potentials having a duration dependent upon the speed of rotation of said rotor core.

3. In combination, an electric circuit, a dynamo-electric machine of the asynchronous type including a plurality of windings and a rotor core, electric valve means interconnecting said circuit and said windings, means for controlling the conductivities of said electric valve means to control the speed of rotation of said rotor core comprising an electron tube for producing an electron beam, electromagnetic means mechanically connected to the rotor core of said machine for rotation in one direction, winding means associated with said electromagnetic means and energized by a polyphase alternating current winding to produce a magnetic field rotating in a direction opposite to the direction of mechanical rotation of said electromagnetic means, the field produced by said magnetic means being arranged to cooperate with said electron tube to deflect said electron beam in a predetermined path for each revolution of the rotor of said dynamo electric machine, a plurality of electrodes associated with said tube and mounted in insulated relation in the path of said electron beam, and a control circuit associated with said electrodes for producing control voltages having a duration corresponding to the slip frequency of said asynchronous dynamo electric machine to control the conductivities of the electric valve means interconnecting said electric circuit and the winding of said dynamo electric machine.

4. In combination, an alternating current circuit, a dynamo-electric machine including a plurality of windings and a rotor core, electric translating apparatus interconnecting said circuit and the windings of said dynamo-electric machine and comprising a plurality of electric valves arranged in groups, a control member for controlling the conductivity of each of said electric valves, a control system for controlling the energization of said control members comprising an electron tube for producing an electron beam, means mechanically connected to said rotor core for deflecting said electron beam in a predetermined path for each revolution of said rotor, a plurality of electrodes associated with said tube and mounted in electrically insulated relation in the path of said electron beam, and a control circuit connected with said electrodes for impressing on the control members of said electric valves control voltages having a duration dependent upon the speed of rotation of said rotor core to render said groups of valves successively conductive.

5. In combination, an electric circuit, a dynamo-electric machine including a plurality of windings and a rotor core, electric valve means interconnecting said circuit and said windings, means for controlling the conductivities of said electric valve means to control the speed of rotation of said rotor core comprising electronic means for producing an electron beam, means for deflecting said beam in response to rotation of said rotor core for producing voltage impulses dependent upon the speed of rotation of said rotor core, and an excitation circuit for controlling said electric valve means in accordance with said voltage impulses.

6. In combination, an alternating current circuit, a motor including a winding having $n$ electrically displaced winding sections, a plurality of electric discharge paths interconnecting said circuit and said winding sections for controlling the transfer of energy therebetween, a control circuit for controlling the conductivities of said electric valve means to energize sequentially said electrically displaced windings comprising means for producing electric impulses having $360/n$ electrical degrees duration at the frequency of the alternating current voltage of said winding sections, means including an inverter circuit for converting said electrical impulses into electrical impulses having a duration which is an integral number of times the duration of the original electrical impulses and which are displaced by $360/n$ electrical degrees, and means for impressing said latter impulses on said control circuit to render said electric discharge paths conductive sequentially in groups to simultaneously energize a number of said electrically displaced windings equal to said integer.

7. In combination, an alternating current circuit, a motor including a winding having $n$ electrically displaced winding sections, electric valve means interconnecting said circuit and said winding sections for controlling the transfer of energy therebetween and including control means, means for controlling the conductivity of said electric valve means comprising means for producing consecutive electrical impulses having $360/n$ electrical degrees duration at the frequency of the alternating voltage of said winding sections, means for converting said electrical impulses into electrical impulses having 180 electrical degrees duration at the frequency of the alternating current voltage of said winding sections but the same electrical displacement as the original electrical impulses, and means for impressing said latter impulses on said control means for controlling the conductivities of said electric valve means.

8. In combination, an alternating current supply circuit, a dynamo-electric machine including a plurality of winding sections and a rotor element, an electric valve frequency changer interconnecting said supply circuit and the windings of said dynamo-electric machine including a plurality of electric valves having control electrodes, means controlling the energization of said control electrodes to control the speed of rotation of said rotor element comprising means for producing an electron beam, means mechanically coupled with said rotor element for deflecting said electron beam in accordance with the rotation of the rotor element to produce a succession of voltage impulses, and means including an electric valve inverter circuit for modifying the voltage impulses produced by deflection of said electron beam.

9. In combination, an alternating current circuit, a dynamo-electric machine having a plurality of winding sections and a rotor element, a frequency changer interconnecting said alternating current circuit and said winding sections including a plurality of electric valves having control electrodes, means for producing an electron beam, means for deflecting said beam in accordance with the rotation of said rotor element to produce a succession of voltage impulses at intervals dependent upon the speed of rotation of said rotor element, means for converting said succession of impulses into a polyphase system of voltages displaced with respect to each other by the same interval as successive ones of said impulses, and means for impressing said polyphase system of voltages on the control electrodes of said electric valves.

10. In combination, an alternating current circuit, a second alternating current circuit, an electric valve frequency charger interconnecting said circuits for transmitting energy therebetween including a plurality of electric valve means having control electrodes, means for controlling the electric valve means of said frequency changer to control the frequency of said second alternating current circuit comprising an electron tube for producing an electron beam, means for deflecting said beam, means for rotating said last mentioned means to deflect said beam in a predetermined path for each revolution of said deflecting means, a plurality of electrodes mounted in the path of said electron beam, and a control circuit connected with said electrodes for impressing on the control electrodes of said electric valve means control voltages occurring in succession at intervals dependent upon the speed of rotation of said deflecting means.

11. A polyphase alternating current supply circuit, a polyphase alternating current load circuit, an electric valve frequency changer interconnecting said circuits for transmitting energy therebetween and including a plurality of electric valve means having control electrodes, means for controlling the electric valve means of said frequency changer to control the ratio of the frequencies of said supply and load circuits including electronic means for producing control voltage impulses variable in periodicity in accordance with the frequency of one of said circuits, electric valve means for converting said impulses to a polyphase system of control voltages having a periodicity which is a fraction of the periodicity of said first mentioned control impulses but which are displaced by the same amount as said first mentioned control impulses, and means for impressing said polyphase voltage impulses on the control electrodes of said electric valve means to control the conductivities thereof.

12. In combination, an alternating current circuit, a dynamo-electric machine including a plurality of windings and a rotor core, electric translating apparatus interconnecting said circuit and the windings of said dynamo-electric machine and comprising a plurality of electric valves arranged in groups, a control member for controlling the conductivity of each of said electric valves, a control system for controlling the energization of said control members comprising an electron tube for producing an electron beam, means mechanically connected to said rotor core for deflecting said electron beam in a predetermined path for each revolution of said rotor, a plurality of electrodes associated with said tube and mounted in electrically insulated relation in the path of said electron beam, and a control circuit connected with said electrodes for impressing on the control members of said electric valves control voltage impulses occurring in succession at intervals dependent upon the speed of rotation of said rotor core to render said group of valves successively conductive.

FREIDRICH HÖLTERS.